Sept. 28, 1954         W. H. BURGER ET AL         2,689,985
                      FLUFF MAKING APPARATUS

Filed April 18, 1947                         5 Sheets-Sheet 1

Inventors:
William H. Burger and
W. Wayne Wheelhouse
By Soans, Pond + Anderson Attys.

Patented Sept. 28, 1954

2,689,985

UNITED STATES PATENT OFFICE 2,689,985

FLUFF MAKING APPARATUS

William H. Burger, Neenah, and Walter Wayne Wheelhouse, Appleton, Wis., assignors to Paper Patents Company, a corporation of Wisconsin Application April 18, 1947, Serial No. 742,392

11 Claims. (Cl. 19—156)

This invention relates to a fluff making method and apparatus. The fluff referred to is a product made by disintegrating paper or papermaker's pulp so as to convert the material into a mass of independent fibres or small pieces which may embody a plurality of fibres in a single piece. Such disintegrated material is known and has been used for various purposes such as the preparation of absorbent and other pads. The material may also be used in the formation of insulation blankets, packaging materials such as padding, and other products.

The main object of the invention is to provide a method and apparatus whereby papermaker's pulp, paper, paperboard or like material may be efficiently converted into fluff and into a web or pad of fluff material in which form it may be employed for making pad-like products, or any other products for which the fluff may be suited.

Another object of the invention is to provide a method and apparatus whereby the fluff produced will be of substantially uniform fineness and whereby the web or pad produced from the fluff will be very soft and of substantially uniform softness and thickness throughout its area.

Other objects and advantages of the invention will be understood by reference to the following specification and accompanying drawings (5 sheets) wherein there is illustrated a selected form of apparatus for producing fluff, and an improved method for producing the said material.

Papermaker's pulpboard is a coarse paper product which somewhat resembles ordinary blotting paper. Such pulpboard is well adapted to conversion into fluff because of the convenience with which the pulpboard may be handled and its low cost. Such pulpboard is supplied in rolls such as represented at 1 in Fig. 1 and the web 2 of the material (or scrap, clippings and other primary or recovered fibre material of suitable character) is suitably fed from the supply roll to a hammer mill 3 which is suitably actuated by any conventional means (not shown). For some purposes the pulpboard may be moistened with water or other liquids or it may have wax or other material suitably applied to it as by means of spraying or dipping, or by means of applicator rolls such as represented at 4 in Fig. 1. However, the application or other treatment of the pulpboard before being fed into the hammer mill 3 is not essential.

The outlet 5 of the hammer mill 3 is connected to a suitable blower 6 which may be also actuated by any power source (not shown), the partially disintegrated pulpboard being discharged through the conduit 7 which extends from the discharge port of the blower 6.

Figure 3:
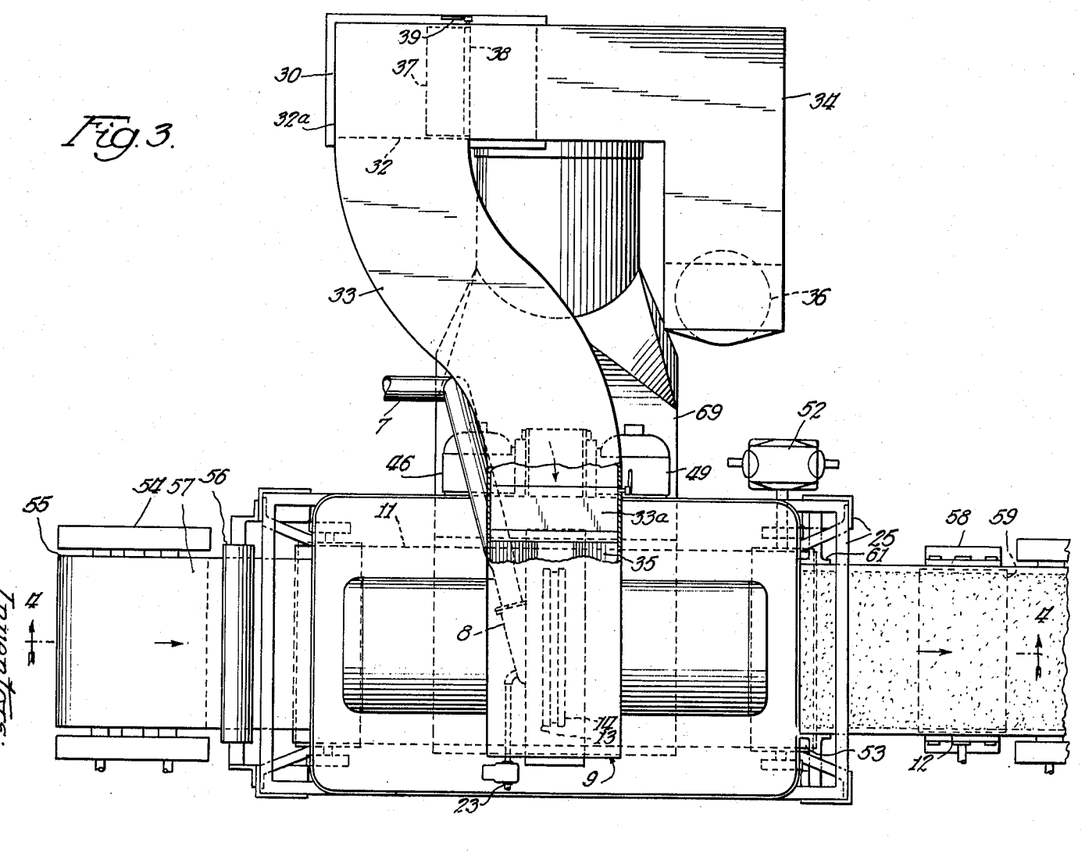
Fig. 3 is a plan view of the mechanism illustrated in Fig. 2.

The conduit 7 carries the initially disintegrated material to the inlet port 8 (Figs. 3 and 6) of an attrition mill 9 which acts on the partially disintegrated material to break it down to the required fibre or fibre-like condition. From the attrition mill 9 the fibre-like material is discharged downwardly into the hood or forming chamber 10 (see Fig. 4) which is arranged over a foraminous belt 11 so that the fibre-like material will be deposited on the belt 11 to form a web or pad of the required thickness. The belt 11 is, of course, propelled continuously so as to deliver a finished pad from beneath the hood 10, the finished pad being transferred to a discharge conveyor 12 and thence to other mechanism for winding the pad on itself or otherwise treating or acting on the pad.

The attrition mill 9 consists of a pair of concentric, oppositely rotated plates or discs 13 and 14 (Fig. 6) which have their adjacent faces provided with cooperating grinding plates 15 and 16, respectively. The grinding plates 15 and 16 may each be formed in sections arranged continuously or in relatively spaced relation and their cooperating faces may be cut to provide various forms of ribs or ridges. The type generally known as "rapid-cut serrated plates" give good results under most conditions.

Figure 6:
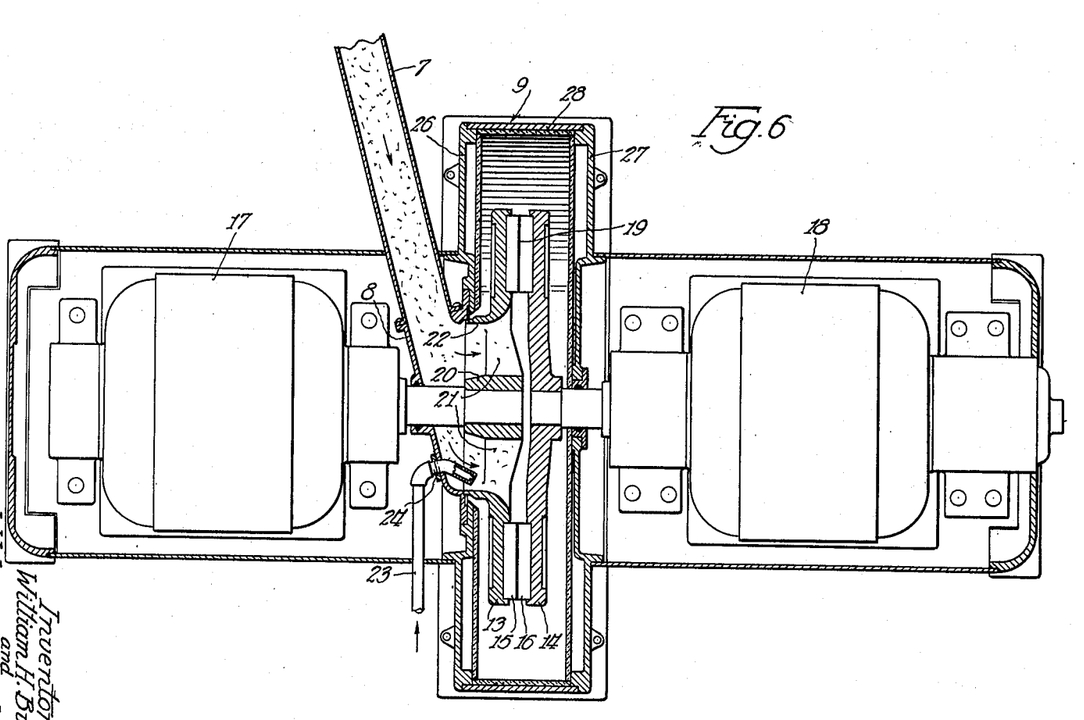
Fig. 6 is a plan section on the line 6—6 of Fig. 4, and Figs. 7 and 8 are sections respectively on the lines 7—7 and 8—8 of Fig. 4.
Figure 7:
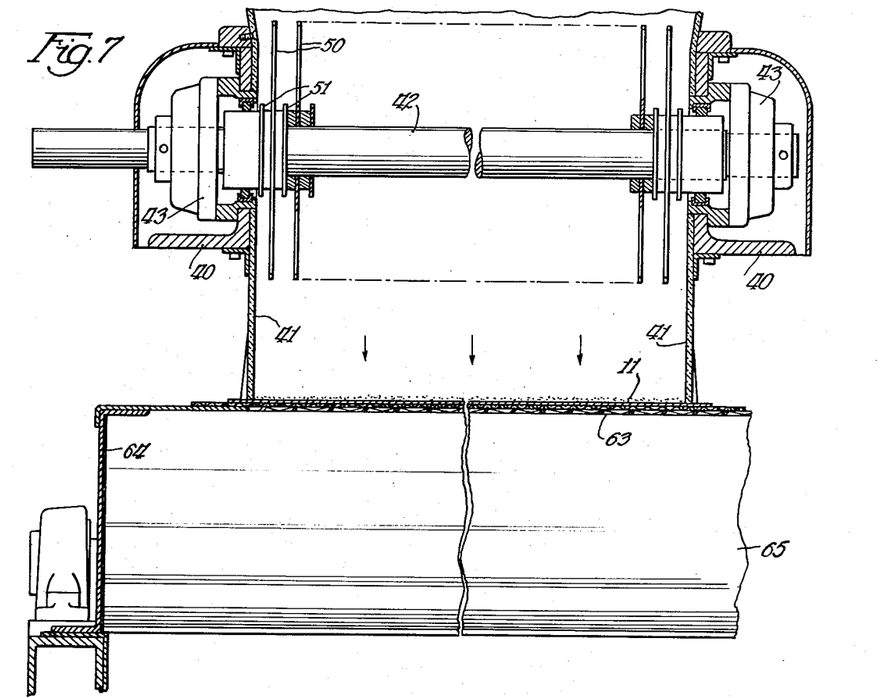

The discs 13 and 14 with their plates 15 and 16 are rotated in opposite directions by means of suitable electric motors 17 and 18 on the shafts of which the said discs are directly mounted. Provision is desirably made for adjusting the rotors 13 and 14 toward and from each other so that the spacing indicated at 19 between their grinding plates 15 and 16 may be varied to suit conditions incurred in operation. With certain kinds of papermaker's pulp, the clearance 19 between the grinding plates 15 and 16 should be about five thousandths (.005) of an inch, but this clearance may be reduced or increased to produce the desired results. The closer the plates are to each other, i. e. the less clearance provided, the finer will be the fluff discharged from the mill. The fineness of the fibre, that is to say the degree of disintegration of the pulpboard, is also determined to some extent by the character of the ridges on the plates 15 and 16. In general, the finer the ridges, the greater will be the disintegration of the pulp.

As shown in Fig. 6, the rotor 14 is a solid, plate-like member whereas the rotor 13 has its hub 20 connected by spoke-like elements 21 to the peripheral portion of the rotor. The rotor 13 is also preferably formed with a smooth-walled inlet opening or mouth portion 22 which communicates with the port 8 to receive the initially disintegrated pulp from the conduit 7. Moisture, preferably in the form of dry steam, may be injected into the initially disintegrated pulp through a steam pipe line 23 which communicates at 24 with the inlet port 8 so as to discharge moisture into the air-borne stream of fibrous material.

The steam is delivered under considerable pressure (for example, 50 to 60 pounds per square inch) and the jet of steam is advantageously directed toward the inside of the wall of the rotor mouth 22 so as to prevent the adherence of fibres thereto incident in part to centrifugal force. Stoppage of the mouth by accumulated fibre is thereby prevented. If the addition of moisture is not desired at this point, for example, if moisture is supplied elsewhere or not required, a jet of air may replace the jet of steam.

The attrition mill 9 and the driving motors 17 and 18 are suitably supported on a framework 25 (Fig. 4), which is provided with suitable cross members and other parts for also supporting the forming hood 10, conveyor 11 and other parts of the apparatus.

The disintegrated paper pulp delivered by the conduit 7 to the inlet of the attrition mill is caused by centrifugal force to pass between the cooperating grinding plates 15 and 16 of the mill to be thereby broken down to fibre-like form. The plates of the attrition mill may be so adjusted into such proximity to each other as to cause the pulp fed thereto to be discharged in the form of separated, substantially individual fibres, or the adjustment may be such that the discarded material will be in the form of fibre-like pieces embodying several fibres bound together. To produce a very light and well puffed-up fluff web, it is desirable that the discharge material be very fine but it is not essential that the pulp material be actually broken down into individual fibre form if that is ever actually accomplished.

The conduit 7 and all other paths through which the disintegrated pulpboard is caused to flow in the described apparatus are desirably made smooth walled and streamlined, i. e. free from recesses, projections, and the like which would tend to trap any of the disintegrated material. The rotors 13 and 14 of the attrition mill are enclosed in a suitable metal casing which embodies outer side members 26 and 27 of metal, a metal circumferential band 28, and a bottom discharge opening represented at 29 (Fig. 4) is provided in the casing. The casing comprising the said parts 26, 27 and 28 is preferably lined with smooth surfaced material, the said lining being so arranged as to provide the desired smooth, non-trapping enclosure. Examples of suitable material for the lining are glass, synthetic glass-like sheeting, such as typified by commercially available "Lucite." Other smooth-surfaced materials may, of course, be employed, it being the purpose to prevent the disintegrated fibres from attaching themselves either mechanically or electrically to any of the surfaces with which they come in contact. Electrical attachment is preventable by proper moisture conditioning of the fibre and also, to some extent, by the use of lining material which is electrically non-conducting.

To promote the flow of the initially disintegrated material from the attrition mill and to deposit the material discharged from the hammer mill in the desired manner on the travelling screen 11, a large volume of air is caused to travel downwardly through the attrition mill chamber. The volume of air is controlled so that its action on the fibres, and its fibre-depositing effect can readily be adjusted to obtain the required fluff deposit on the travelling belt 11.

Figures 1, 2:
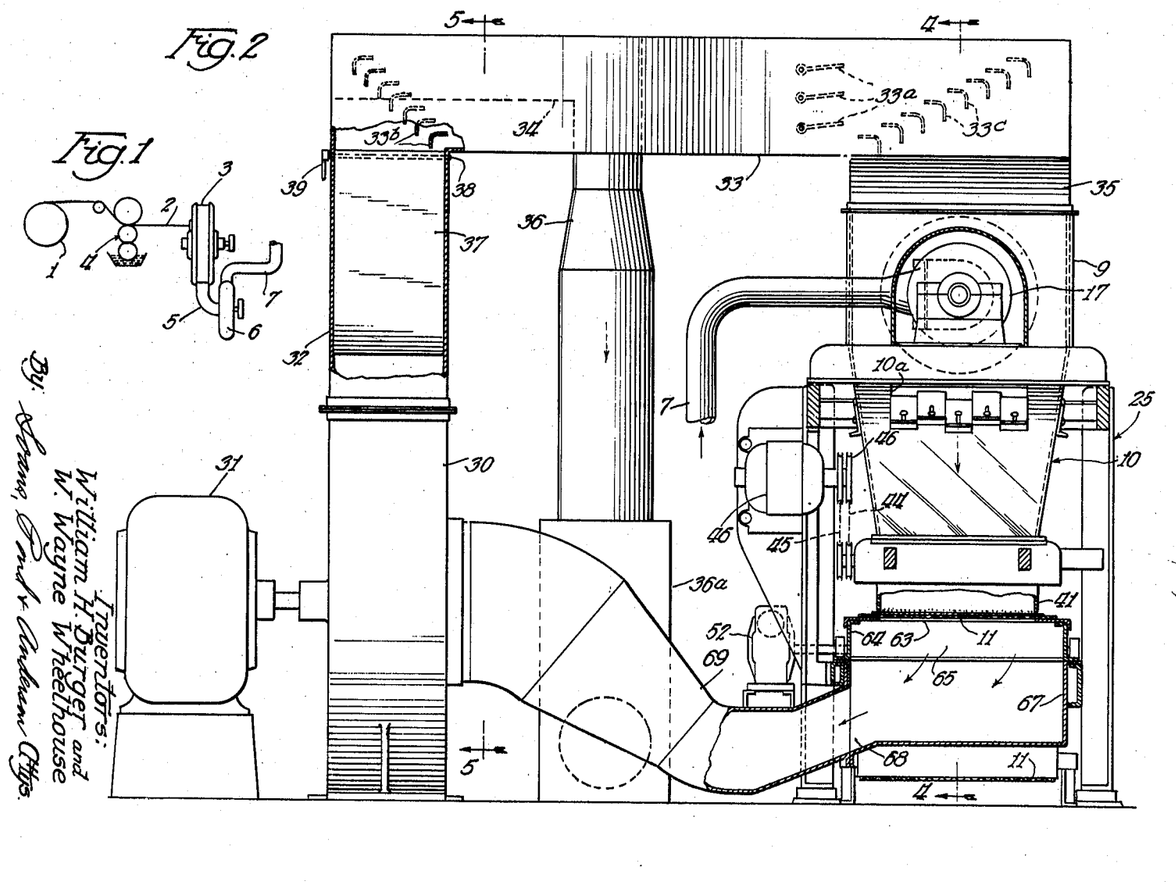
Fig. 1 is a more or less diagrammatic view illustrating typical mechanism employed for initially breaking down or disintegrating a web of papermaker's pulp.
Fig. 2 is an end view in which parts have been shown in section to reveal certain details of construction of apparatus for acting on the initially disintegrated material to complete its conversion into the desired fluff, the plane of the view being represented by the line 2—2 on Fig. 4.
Figures 4, 5:
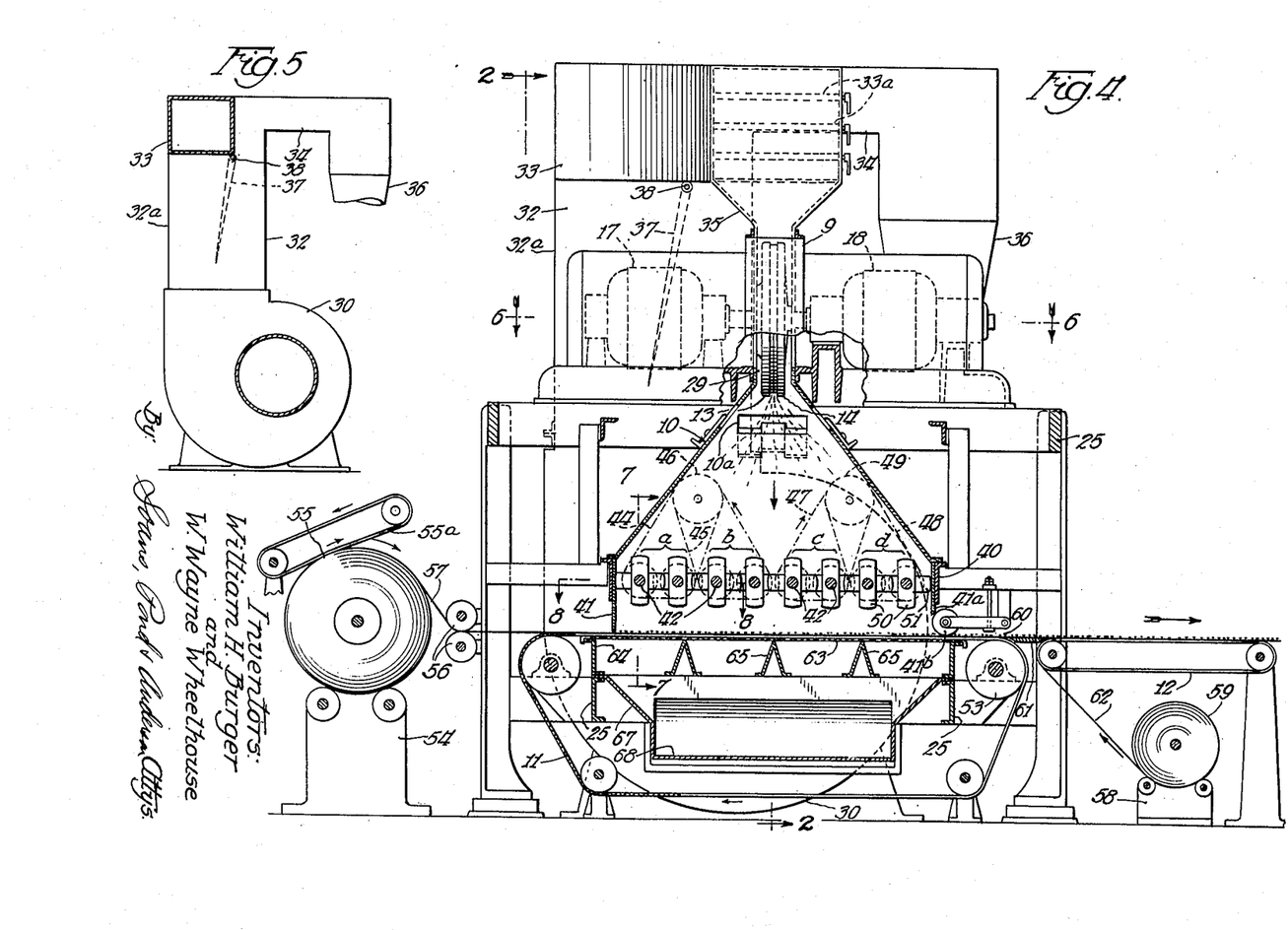
Fig. 4 is a section on the line 4—4 of Fig. 2.
Fig. 5 is a section on the line 5—5 of Fig. 2 but on a reduced scale.

Air flow through the attrition mill housing or chamber 9 is induced by means of a blower 30 (Figs. 2, 3 and 5) which may be driven by an electric motor or the like indicated at 31. The blower 30 discharges a column of air into an upwardly extending conduit 32 which is here represented as being of rectangular cross-section. At its upper end, said conduit 32 has two laterally extending branches 33 and 34, the branch 33 leading to a downwardly extending hopper-like member 35 which communicates with the upper end of the attrition mill casing 9 as best shown in Figs. 2 and 4. The branch 34 connects with a downwardly extending conduit 36 which exhausts to the outside atmosphere through a suitable dust trap 36a which prevents any entrained fibre or fluff material from being discharged into the atmosphere.

The volume of air flowing through the attrition mill housing has an important bearing on the characteristic of the fluff material produced by the apparatus, and the said air volume is adjustable or controllable by means of an adjustable vane or valve plate 37 located in the rectangular riser 32 as best shown in Figs. 2 and 5. The vane 37 is hinged at its upper end as indicated at 38 so as to be pivotally adjustable toward and from opposite sides of the riser 32 to divide the column of air into separate columns which respectively enter the branches 33 and 34. Adjustment of the vane 37 may be conveniently effected by means of a handle 39 secured to the pivot shaft 38 which carries the vane. Any suitable means (not shown) may be provided for locking the handle 39 and the vane 37 in selected position of adjustment.

As will presently appear, some of the air flowing through the apparatus is recirculated, and it will be seen that control of the volume or velocity of the air through the attrition mill housing and forming chamber is attained, at least in part, by regulation of the air columns which are directed into the branch 33 and outlet or discharge connection 36.

The hood 10 previously referred to constitutes the upper portion of a chamber into which the disintegrated pulp is directly discharged by the attrition mill 9. Said hood is supported on a horizontally disposed rectangular frame structure 40 which is in turn supported by suitably arranged main frame portions as represented in Fig. 4. Said horizontal frame 40 is provided with suitable lining plates 41 which extend from the upper edges of the respective sides of the frame structure downwardly to a point closely adjacent the conveyor belt 11 except to the extent that the liner plate 41a at the discharge side of said chamber has its lower edge spaced upwardly from the said conveyor a greater distance as indicated. A vertically adjustable sealing roll 41b is provided to more or less iron the issuing fluff web to uniform thickness as desired.

In said frame structure 40 there are rotatably mounted a series of shafts 42 which extend across the frame, the shafts being rotatably mounted in suitable bearings 43 carried by said frame 40. Said bearings are sealed in any well known manner to prevent the entrance of any of the fluff material into said bearings. The shafts 42 are, in this instance, arranged in pairs, there being four pairs respectively designated a, b, c and d (Fig. 4). The shafts 42 of the pairs a and b are driven in a counterclockwise direction as viewed in Fig. 4, the pair a being driven by means of a belt 44 and the pair b being driven by a belt 45. The belts 44 and 45 cooperate with suitable pulleys on the shafts 42 and with suitable pulleys on the driven shaft of an electric motor 46 (Figs. 2 and 3) which is mounted on the main frame structure 25.

The shafts 42 of the pairs c and d are driven in a clockwise direction as viewed in Fig. 4 by means of belts 47 and 48 which cooperate with suitable pulleys carried by the shafts and suitable pulleys carried by the driven shaft of an electric motor 49 which, like the motor 46 is supported by the main frame structure 25.

Figure 8:
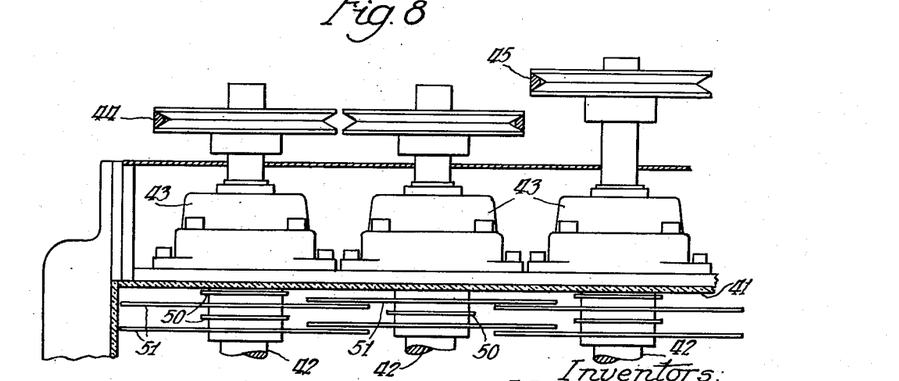

Each of the shafts 42 is equipped with a series of plates or bars 50 and 51, the said plates being of elongated form, and the plates 50 being disposed with their lengths extending transversely of the lengths of the plates 51. The plates 50 and 51 of adjacent shafts 42 are staggered so that when the shafts rotate, the plates of one shaft will not engage the plates of another shaft but will pass each other side by side as shown in Fig. 8. The arrangement of plates 50 and 51 on the shafts 42 is continuous across the entire length of each shaft so that the fluff material descending in the chamber formed by the hood 10 and the frame 40 must pass through the screen-like bed formed by the multiplicity of plates 50 and 51 on the shafts 42. These shafts are driven at a high rate of speed so that any collection of fibers can practically never pass through the said bed without being subjected to the breaking action of the plates of one or more of the rotating plate-carrying shafts which, for convenience, have been designated by the term "whizzers."

The fibrous material after passing through the whizzers is deposited on the screen conveyor 11 which is propelled continuously by means of a suitable electric motor 52 (Figs. 2 and 3) which, in this instance, directly drives the conveyor pulley 53 and thereby the conveyor band 11. Suitable means is provided for adjusting the speed at which the conveyor is driven so as to thereby permit adjustment of the depth of the fibrous material which will be collected on the conveyor belt and carried out of the depositing chamber under the edge of the lining plate 41a. Such speed-controlling means may consist of a variable speed motor 52 or any other desired equipment of which many are well known. In some instances it may be preferred to deposit the fibrous material directly on a web of creped tissue or other paper. To that end there is provided a suitable supporting stand 54 on one side of the mechanism for supporting a roll 55 of the desired paper, and guide rolls 56 for guiding the paper web 57 into place on the conveyor 11 as it enters the fluff-depositing chamber. A suitably driven feed belt 55a or other means may be provided for effecting delivery of the web to the screen belt 11.

In other instances it may be preferred to deposit the fibre directly on the belt 11 and to transfer the deposited web of fibres from the belt 11 to a paper web. For this purpose a suitable stand 58 may be provided for supporting a roll 59 of the desired paper or other material, the web of material from the roll 59 being drawn upwardly and over the receiving end of another conveyor 12. In that case, the web 60 of fluff can be stripped from the foraminous belt 11 by means of a transfer plate 61 which also serves to deliver the web of fluff to the conveyor 12 or to a web 62 on said conveyor 12.

The foraminous conveyor belt 11 which passes under and forms the bottom of the depositing chamber, has its upper reach supported by means of a foraminous member 63 which may consist, for example, of a sheet of expanded metal. Said sheet of expanded metal is supported by a rectangular frame 64 which is slightly longer and wider than the rectangular frame 40 forming the lower portion of the depositing chamber, and said frame 64 is in turn supported by main frame portions 25 provided for that purpose. To further support the foraminous member 63, a plurality of cross members 65 extend from side to side of the frame 64, these supports being preferably in the form of inverted V-shaped members as represented in Fig. 4 so as to avoid any reduction in the area of air passageways through the supporting member 63.

A hood 67 is formed below the frame 64 and suitably connected therewith as shown in Figs. 2 and 4 to provide a receiver for the air passing downwardly from the depositing chamber and through the conveyor 11 and supporting member 63. Said hood 67 is provided with an outlet 68 at one side which is connected by means of a suitable conduit 69 to the inlet port of the blower 30 (see Fig. 2). The blower 30 is in a continuous flow air conduit or circuit wherein air is forced out of the discharge end of the blower through the conduit 32 into the branch conduit 33 and thence into the attrition mill housing 9 and downwardly through the forming chamber formed by the hood 10 and frame 40, through the foraminous conveyor 11 and foraminous supporting member 63 into the hood 67 and back through the conduit 69 to the blower 30.

The arrangement of the whizzers (the shafts 42 and plates 50 and 51) in two oppositely rotating sets is such that these sets tend to spread the downward flow of fibre toward the ends of the forming chamber from the central portion thereof. This detail helps to secure even distribution of the fluff or fibre and the deposition of a uniform layer of fluff on the travelling conveyor. The fluff is, of course, somewhat forcefully deposited on the travelling conveyor incident to the air current which carries the fluff downwardly, and this is so even though a web of creped tissue or like paper 57 is first placed on the conveyor belt. The web of paper 57 will, of course, be quite porous as typified by creped tissue paper so that the air flow may continue at a sufficient velocity to produce the desired fibre deposition on the paper web.

The vane or deflector 37 should preferably be adjusted so that a slight vacuum will be maintained in the forming chamber. In the arrangement described, this is quite practicable by discharging an adequate portion of the air column through the discharge branch 34 and 36 by appropriate adjustment of the said deflector. It will be seen that the blower 30 is capable of withdrawing from the forming chamber through the conveyor belt, the hood 67 and the conduit 69 more air than is fed into the attrition mill through the conduit branch 33 when a sufficient portion of the withdrawn air is discharged to the atmosphere through the said discharge branch 34—36. Pivotally adjustable deflectors represented at 33a in the conduit branch 33, augmented by series 33b and 33c of deflectors or dividers, afford a desirable control of the air flow through the branch conduit 33 and into the attrition mill 9. By appropriately positioning and adjusting these deflectors, substantially uniform dispersion of air currents through the housing of the attrition mill and into the forming chamber 10 can be effected.

The flow of the air-borne fibre from the attrition mill into the forming chamber may be further controlled by opening or closing openings such as indicated at 10a (Figs. 2 and 4) in the forming chamber hood. By regulation of such openings, the flow of fibre may be directed toward the central axis of the chamber which is between the two banks of whizzers. The fibres are then exposed to repeated action of the whizzers which tend to throw the fibres towards the opposite ends of the chamber. Complete breaking of any clots of fibres is thereby assured.

Although the forming chamber is preferably maintained under a slight vacuum, it should nevertheless be understood that the arrangement is such that a very high volume of air is maintained in the forming chamber in relation to the weight of fluff therein. The constant discharge of air from the circulating system is required to attain the indicated pressure control, because of the entrance of air into the system by leakage, especially at the forming screen, and because of the constant supply of air from the hammer mill 3 and its associated blowers 6.

In the production of a soft and uniformly deposited web of fluff material, it is desirable that the fibre-to-air ratio in the forming chamber be very low. A fibre-to-air ratio in that chamber of about 1.5% by weight, i. e., a weight ratio of about 1.5 to 100, or even less produces very desirable results for certain products. This ratio may be considerably lower and higher to produce acceptable products for various purposes.

The moisture content and other characteristics of the fibre, the density of the desired product, its thickness, and other factors enter into the determination of the most suitable fiber-to-air ratio for production purposes.

About 15 pounds of pulp can be processed per minute with the recirculation of about 7,000 cubic feet of air per minute in the illustrated apparatus in which the bottom dimensions of the forming hood are of the order of 60 inches in length and 30 inches in width, the length being in the direction in which the forming conveyor 11 travels. This air volume and screen size indicate an air velocity of the order of 500 feet per minute through the forming screen, but it may be observed that because of the expanding form of the chamber, this velocity is lower than that in the narrow upper portion of the forming chamber 10.

The whizzers 11 in the illustrated embodiment of apparatus are approximately 10 inches in diameter, and they are driven at a high rate of speed such as 1,800 revolutions per minute. They are preferably located as near to the forming wire as possible without disturbing or preventing the fluff formation on the forming belt or conveyor 11, the purpose of maintaining a close relationship between these parts being that of preventing re-clotting of the fibres which have passed through the whizzers, and which fibres it is desired to deposit in their separated form. In apparatus of the illustrated proportions, there should be a pressure drop between the forming chamber above the forming wire 11 and the suction chamber below the same of from 2 to 10 inches of water. Such a pressure relationship will insure the passage of the necessary amount of air through the forming area on the belt and the deposition of the separated fibres at the required rate for continuous operation of the apparatus. The higher the pressure differential, the closer can be the relationship between the whizzers and the forming area since the higher pressure differential will result in faster movement of the separated fibres to deposited position on the forming belt, and thereby preventing floating or migrating of the fibres toward each other into clotted or bunched condition.

In the described apparatus, steam has been referred to as being injected for moistening purposes. Other moistening means may be employed such as adding steam at the hammer mill entrance opening, spraying water on the pulpboard before it enters the hammer mill or humidifying the air before admitting it to the hammer mill. Also, the air which is recirculated in the apparatus may be humidified by any of the methods just indicated. However, the injection of steam into the attrition mill as illustrated is a very satisfactory manner of accomplishing the addition of moisture. Such steam does not merely moisten the fibres but also serves to humidify the air and serves as a conducting medium for transferring the charges on the fibres to the metal walls of the conduits which are grounded. This prevents static electricity from accumulating on the fibres and the fibres from being attracted to each other and to the walls of the conduits on which they might otherwise tend to collect with a tendency to close the conduits. Proper moistening of the fibre substantially eliminates adverse electrical effects and non-conducting conduits may be substituted for metal conduits if desired.

In addition to lining the attrition mill with smooth surfaced material such as glass or glasslike materials, plywood sheeting, stainless steel, etc., the walls of the forming chamber 10 and the lining plates 41 and 41a of the horizontal frame 40 are also preferably made of similar smooth surfaced materials so as to prevent as far as possible any adhesion and collection of fibres on those surfaces. Transparent glass-like material is preferably used for forming the walls of the forming chamber 10 so that the fibre formation can be readily observed and steps promptly taken to prevent any clotting tendency which may develop from time to time under varying operating conditions. Atmospheric temperature and humidity have some effect as do also the characteristics of the pulp being disintegrated and converted into fluff. Any pronounced tendency for fibre to collect on the walls of the forming chamber would be readily noticed, and it would, of course, be apparent that similar accumulation would be started on other passageways through which the fibre is conducted. Hence, the operators would be promptly forewarned of the need for the taking of steps to discourage and prevent such fibre accumulation.

The characteristics of the fluff web produced by the machine, especially the bulkiness or thickness of the web is influenced to a considerable extent by the pressure differential on the forming wire. The lower this pressure differential, the greater will be the bulk and softness of the fluff web formed.

The air-formed fluff web resulting from operation of the described apparatus is useful in many fields of which absorbent pads for bandages and other purposes, filters, insulation packing, etc., are examples. For application in these various fields, the density, thickness, and other characteristics of the web may require changing, and such changes can easily be effected by varying the pressure differential above and below the forming wire, the spacing of the cooperating plates of the attrition mill, the ratio of fibre-to-air in the system, the speed at which the forming wire 11 is driven, and/or the mesh of said wire or a paper web thereon and other possible variables. The apparatus is capable of forming a 30-inch wide web of fluff material ⅛ inch thick at a speed of the order of 200 feet per minute. Greater speeds, for example 400 feet per minute may be attained under some circumstances and depending in part on the thickness and density of web desired, inherent capacity of the machine, character of the fibre, and other factors.

In instances where fine disintegration of the fibrous material is not required, and where the fibrous material supplied to the apparatus is of such character that it may be easily disintegrated, passage of the material through a single disintegrator such as a hammer mill or an attrition mill may be sufficient. In some instances, a hammer mill may be substituted for the attrition mill in the arrangement described.

Instead of mounting the attrition mill plates directly on the motor shafts, the mill plates may be belt or otherwise driven from the same or from separate motors.

The whizzers above referred to as being about 10 inches in diameter may be smaller or larger, if desired. Whizzers having a diameter of 6 inches have been successfully used.

Various other changes in the described construction may be made while employing the principles of the apparatus as described, and without departing from the invention as set forth in the following claims.

We claim:

1. Apparatus for forming an air-laid web of fibrous material, comprising a screen, means for disintegrating fibrous material into separated, small, fibre-like pieces and for conducting a fast moving air stream for carrying said pieces from said disintegrating means to said screen so as to deposit said pieces on said screen, and fibre distributing means disposed in the path of said stream ahead of said screen for spreading said fibre pieces over the area of said screen, said distributing means comprising a plurality of axially parallel, relatively spaced rotatable shafts, a plurality of plates mounted on each of said shafts in relatively spaced relation, said plates being of such size and so spaced and located on the respective shafts that the plates of one shaft mesh with and are adapted to pass between the plates of an adjacent shaft, and means for rotating one group of said shafts which are adjacent to each other in one direction and another group of said shafts which are adjacent to each other in the opposite direction.

2. Apparatus for forming an air-laid web of fibrous material, comprising a screen, means for disintegrating fibrous material into separated, small, fibre-like pieces and for conducting a fast moving air stream for carrying said pieces from said disintegrating means to said screen so as to deposit said pieces on said screen, and fibre distributing means disposed in the path of said stream ahead of said screen for spreading said fibre pieces over the area of said screen, said distributing means comprising a plurality of axially parallel, relatively spaced rotatable shafts, a plurality of plates mounted on each of said shafts in relatively spaced relation, said plates being of such size and so spaced and located on the respective shafts that the plates of one shaft mesh with and are adapted to pass between the plates of an adjacent shaft, and means for uni-directionally rotating a predetermined group of said shafts which are adjacent to each other and for rotating in the opposite direction an adjacent group of other of said shafts which are adjacent to each other, thereby to cause said groups of shafts and plates to respectively influence fibre-like pieces to move laterally in opposite directions so as to resist concentration of the flow of said fibre pieces in a localized area ahead of said screen.

3. The apparatus for forming an air-laid web of fibrous material, comprising means for disintegrating fibrous material into separated, small, fibre-like pieces, a screen, means for supplying and conducting an air current for carrying said fibre pieces to said screen, said means comprising a forming chamber associated with one side of said screen, said forming chamber having an inlet end for receiving said air current of fibre-like pieces and being gradually enlarged from said inlet end to a fibre depositing end, or base arranged in a plane parallel to the plane of said screen, said chamber serving to facilitate the spreading of the air-borne stream of fibres to approximately the area of the base of said forming chamber, and fibre distributing means in the base portion of said chamber comprising a plurality of axially parallel, relatively spaced, rotatably mounted shafts disposed in a plane which is approximately parallel to the plane of said screen, a plurality of plates mounted on each of said shafts in relatively spaced relation, said plates being of such size and so shaped and located on the respective shafts that the plates of each shaft mesh with and are adapted to pass between the plates of each adjacent shaft, means for uni-directionally rotating a predetermined group of said shafts which are adjacent to each other and for rotating in the opposite direction an adjacent group of other of said shafts which are adjacent to each other, thereby to cause said groups of shafts and plates to respectively influence fibre-like pieces to move laterally in opposite directions so as to resist concentration of the flow of said fibre pieces in a localized area through the base portion of said chamber.

4. In apparatus of the class described, the combination of an attrition mill embodying a pair of relatively rotatable plates adapted to act on pieces of fibrous material to disintegrate the same, means for delivering an air-borne stream of pieces of fibrous material to said attrition mill, a forming screen, a pyramidal shaped forming chamber having its apex end connected to said attrition mill for receiving said disintegrated fibre pieces from said mill and its base portion disposed adjacent to and in substantially parallel relation to one side of said forming screen, a suction chamber associated with the opposite side of said screen, a blower having its intake connected to said suction chamber, a conduit interconnecting the outlet of said blower and said attrition mill so as to conduct air discharged by said blower through said mill for entraining the fibrous material discharged by said mill and carrying the same through said forming chamber and to said screen, said screen serving to extract said fibre from the air incident to the movement of the air through said screen and into said suction chamber.

5. In apparatus of the class described, the combination of an attrition mill embodying a pair of relatively rotatable plates adapted to act on pieces of fibrous material to disintegrate the same, means for delivering an air-borne stream of pieces of fibrous material to said attrition mill, a forming screen, a pyramidal shaped forming chamber having its apex end connected to said attrition mill for receiving said disintegrated fibre pieces from said mill and its base portion disposed adjacent to and in substantially parallel relation to one side of said forming screen, a suction chamber associated with the opposite side of said screen, a blower having its intake connected to said suction chamber, a conduit interconnecting the outlet of said blower and said attrition mill so as to conduct air discharged by said blower through said mill for entraining the fibrous material discharged by said mill and carrying the same through said forming chamber and to said screen, said screen serving to extract said fibre from the air incident to the movement of the air through said screen and into said suction chamber, and means in the base portion of said forming chamber for breaking up lumps of clotted fibres immediately before such fibres reach said forming screen.

6. In apparatus of the class described, the combination of an attrition mill embodying a pair of relatively rotatable plates adapted to act on pieces of fibrous material to disintegrate the same, means for delivering an air-borne stream of pieces of fibrous material to said attrition mill, a forming screen, a pyramidal shaped forming chamber having its apex end connected to said attrition mill for receiving said disintegrated fibre pieces from said mill and its base portion disposed adjacent to and in substantially parallel relation to one side of said forming screen, a suction chamber associated with the opposite side of said screen, a blower having its intake connected to said suction chamber, a conduit interconnecting the outlet of said blower and said attrition mill so as to conduct air discharged by said blower through said mill for entraining the fibrous material discharged by said mill and carrying the same through said forming chamber and to said screen, said screen serving to extract said fibre from the air incident to the movement of the air through said screen and into said suction chamber, means in the base portion of said forming chamber for breaking up lumps of clotted fibres immediately before such fibres reach said forming screen, and adjustable means for regulating the volume of air delivered to said forming chamber through said attrition mill so as to facilitate the maintenance in said forming chamber of air pressure which is lower than the surrounding atmospheric pressure but higher than the pressure in said suction chamber.

7. Apparatus for forming a web of fibrous material comprising a screen, a housing forming a chamber on one side of said screen, means communicating with said chamber for delivering disintegrated fibrous material to said chamber and pneumatically causing such fibrous material to flow in said chamber towards said screen and be deposited thereon, and fibre clot breaking mechanism disposed intermediate the entrance for fibre into the chamber and said screen, whereby substantially all of the fibre deposited on said screen is subjected to the action of said clot breaking mechanism before being deposited on the screen, said fibre clot breaking mechanism comprising a plurality of axially parallel, relatively spaced, rotatable shafts, means for rotating a plurality of adjacent shafts in the same direction, a plurality of plates mounted on each of said shafts in relatively spaced relation, said plates being of such size and so spaced and located on the respective shafts that the plates of one shaft mesh with and are adapted to pass between the plates of an adjacent shaft so that portions of the plates of adjacent shafts will pass each other while moving respectively in opposite directions intermediate such shafts whereby said plates cooperate to break the fibre clots which are carried toward said screen, said fibre clot breaking mechanism being positioned in close proximity to said screen so as to prevent re-clotting of a significant quantity of said fibre during the flow thereof from said clot breaking mechanism to said screen.

8. Apparatus for forming a web of fibrous material comprising a screen, a housing forming a chamber on one side of said screen, means for disintegrating fibrous material into separated, small, fibre-like pieces, means communicating with said chamber for delivering disintegrated fibrous material from said disintegrating means to said chamber and pneumatically causing such fibrous material to flow in said chamber toward said screen and be deposited thereon, and fibre clot breaking mechanism disposed intermediate the entrance for fibre into the chamber and said screen, whereby substantially all of the fibre deposited on said screen is subjected to the action of said clot breaking mechanism before being deposited on the screen, said fibre clot breaking mechanism comprising a plurality of axially parallel, relative spaced, rotatable shafts, means for rotating a plurality of adjacent shafts in the same direction, and a plurality of plates mounted on each of said shafts in relatively spaced relation, said plates being of such size and so spaced and located on the respective shafts that the plates of one shaft mesh with and are adapted to pass between the plates of an adjacent shaft so that portions of the plates of adjacent shafts will pass each other while moving respectively in opposite directions intermediate such shafts whereby said plates cooperate to break the fibre clots which are carried toward said screen, and said fibre clot breaking mechanism being positioned in close proximity to said screen so as to prevent reclotting of a significant quantity of said fibre during the flow thereof from said clot breaking mechanism to said screen.

9. Apparatus for forming a web of fibrous material, comprising a screen, a chamber-forming housing having a discharge opening adjacent to one side of said screen, means communicating with said chamber for delivering an airborne stream of disintegrated fibrous material to said chamber for movement therethrough to said screen, and fiber clot breaking mechanism traversing substantially the entire transverse area of said fiber stream so that substantially all of the fiber will pass through the area of operation of said clot breaking mechanism, said clot breaking mechanism paralleling said screen and being disposed in such proximity thereto that the fiber emerging from various portions of said clot breaking mechanism will travel substantially like, short distances directly to and be deposited on said screen without opportunity for a significant amount of the fibers to flow together into clots before deposition of the fibers on said screen.

10. Apparatus for forming a web of fibrous material, comprising a screen, a chamber-forming housing having a discharge opening adjacent to one side of said screen, means communicating with said chamber for delivering an airborne stream of disintegrated fibrous material to said chamber for movement therethrough to said screen, and fiber clot breaking mechanism traversing substantially the entire transverse area of said fiber stream so that substantially all of the fiber will pass through the area of operation of said clot breaking mechanism, said clot breaking mechanism comprising a plurality of sets of relatively rotatable, axially spaced members, the members of each of said sets being disposed in staggered relation to those of adjacent sets and in such relation thereto as to pass between the members of adjacent sets when the same are rotated, and means for rotating said members, said clot breaking mechanism being disposed in such proximity to said screen that the fiber emerging from said clot breaking mechanism will flow substantially directly to and be deposited on said screen without opportunity for a significant amount of the fibers to flow together into clots before deposition of said fibers on said screen.

11. In apparatus of the class described, the combination of a mill which is operative to disintegrate pieces of fibrous material, means for delivering a stream of fibrous material to said mill for disintegration thereby, a forming screen, a chamber-forming housing having an inlet opening connected to said mill for receiving disintegrated fiber material from said mill and having a discharge opening disposed adjacent to one side of said forming screen, a suction box associated with the other side of said screen, a blower having an intake connected to said suction box and an outlet connected to said mill so as to conduct air from said suction box to said mill for entraining the disintegrated fiber material discharged by said mill to carry such fiber material rapidly through said chamber to said screen, said screen serving to extract said fiber from the air to form the fiber into a web, and fiber clot breaking means traversing substantially the entire area in said chamber through which said air entrained fiber is carried to said screen, said clot breaking means being disposed in such proximity to said screen that the fiber emerging from said clot breaking means will flow substantially directly to and be deposited on said screen without opportunity for a significant amount of the fibers to flow together into clots before deposition of said fibers on said screen.

References Cited in the file of this patent

UNITED STATES PATENTS

| Number | Name | Date |
|---|---|---|
| 1,299,982 | Martin | Apr. 8, 1919 |
| 1,713,309 | Upson | May 14, 1929 |
| 1,736,142 | Tomlinson | Nov. 19, 1929 |
| 1,758,539 | Schuchardt | May 13, 1930 |
| 1,774,393 | Miller | Aug. 26, 1930 |
| 1,952,208 | Hussey | Mar. 27, 1934 |
| 2,152,901 | Manning | Apr. 4, 1939 |
| 2,195,158 | Watts | Mar. 26, 1940 |
| 2,280,250 | Miller | Apr. 21, 1942 |
| 2,319,666 | Drill | May 18, 1943 |
| 2,375,284 | Coss | May 8, 1945 |
| 2,450,511 | Harner et al. | Oct. 5, 1948 |
| 2,569,765 | Kellett et al. | Oct. 2, 1951 |
| 2,577,784 | Lynam | Dec. 11, 1951 |

FOREIGN PATENTS

| Number | Country | Date |
|---|---|---|
| 294,079 | Germany | Sept. 11, 1916 |
| 422,226 | Great Britain | Jan. 8, 1935 |